(12) United States Patent
Chengalvarayan et al.

(10) Patent No.: US 7,596,370 B2
(45) Date of Patent: Sep. 29, 2009

(54) MANAGEMENT OF NAMETAGS IN A VEHICLE COMMUNICATIONS SYSTEM

(75) Inventors: Rathinavelu Chengalvarayan, Naperville, IL (US); John J. Correia, Livonia, MI (US)

(73) Assignee: General Motors Corporation, Detroit, MI (US)

( * ) Notice: Subject to any disclaimer, the term of this patent is extended or adjusted under 35 U.S.C. 154(b) by 743 days.

(21) Appl. No.: 11/014,497

(22) Filed: Dec. 16, 2004

(65) Prior Publication Data

US 2006/0135215 A1    Jun. 22, 2006

(51) Int. Cl.
| | |
|---|---|
| G10L 21/00 | (2006.01) |
| H04M 1/64 | (2006.01) |
| H04M 11/00 | (2006.01) |
| H04M 3/42 | (2006.01) |
| H04M 3/00 | (2006.01) |
| H04M 1/00 | (2006.01) |
| G05D 1/00 | (2006.01) |
| G01C 22/00 | (2006.01) |
| H04B 1/38 | (2006.01) |
| H04W 4/00 | (2009.01) |

(52) U.S. Cl. .................... 455/418; 704/270; 704/270.1; 704/275; 379/88.01; 379/88.05; 701/1; 701/24; 701/200; 455/408; 455/409; 455/414.1; 455/414.2; 455/432.3; 455/563; 455/569.1; 455/569.2; 455/419; 455/420

(58) Field of Classification Search ................ 704/270, 704/275, 2, 270.1; 379/88.01, 88.05; 701/1, 701/24, 200; 455/408, 409, 414.1–414.3, 455/432.2, 432.3, 563, 418, 419
See application file for complete search history.

(56) References Cited

U.S. PATENT DOCUMENTS

| | | | | |
|---|---|---|---|---|
| 5,802,460 | A * | 9/1998 | Parvulescu et al. | 455/92 |
| 6,085,160 | A * | 7/2000 | D'hoore et al. | 704/256.2 |
| 6,157,321 | A * | 12/2000 | Ricci | 340/902 |
| 6,438,520 | B1 | 8/2002 | Curt et al. | |
| 6,505,780 | B1 | 1/2003 | Yassin et al. | |
| 6,556,971 | B1 * | 4/2003 | Rigsby et al. | 704/270 |
| 6,690,772 | B1 | 2/2004 | Naik et al. | |
| 6,738,738 | B2 | 5/2004 | Henton | |
| 6,983,171 | B2 * | 1/2006 | Van Bosch et al. | 455/557 |
| 6,987,964 | B2 * | 1/2006 | Obradovich et al. | 455/414.1 |
| 7,050,834 | B2 * | 5/2006 | Harwood et al. | 455/563 |
| 7,212,783 | B2 * | 5/2007 | Gaumond et al. | 455/3.06 |
| 7,245,905 | B2 * | 7/2007 | Kamdar et al. | 455/418 |
| 7,319,742 | B2 * | 1/2008 | Levine | 379/88.18 |
| 7,352,848 | B2 * | 4/2008 | Stillman et al. | 379/88.03 |
| 7,516,072 | B2 * | 4/2009 | Campbell et al. | 704/270 |
| 7,533,023 | B2 * | 5/2009 | Veprek et al. | 704/270.1 |

(Continued)

OTHER PUBLICATIONS

"Robust HMM Training for Unified Dutch and German Speech Recognition", Rathi Chengalvarayan, Lucent Speech Solutions, Lucent Technologies Inc., pp. 509-512, 2002.

*Primary Examiner*—David R Hudspeth
*Assistant Examiner*—Paras Shah

(57) ABSTRACT

A method for managing user nametags for a vehicle communications system, the method including receiving a nametag transfer request at a call center from a source, determining a target vehicle associated with the source based on the request and modifying a source nametag data file based on an acoustic profile of the target vehicle, wherein the source nametag data file is one of an audio file and a text file.

10 Claims, 10 Drawing Sheets

U.S. PATENT DOCUMENTS

| | | | |
|---|---|---|---|
| 2002/0013707 A1* | 1/2002 | Shaw et al. | 704/257 |
| 2002/0118803 A1* | 8/2002 | Mahoney | 379/88.03 |
| 2002/0197988 A1* | 12/2002 | Hellaker | 455/423 |
| 2002/0198632 A1* | 12/2002 | Breed et al. | 701/1 |
| 2003/0050779 A1* | 3/2003 | Riis et al. | 704/236 |
| 2003/0144005 A1* | 7/2003 | Videtich | 455/456 |
| 2004/0002359 A1* | 1/2004 | Deas et al. | 455/556.2 |
| 2004/0037399 A1* | 2/2004 | Manohar | 379/88.03 |
| 2004/0219954 A1* | 11/2004 | Odinak | 455/569.1 |
| 2006/0149457 A1* | 7/2006 | Ross et al. | 701/117 |
| 2006/0217109 A1* | 9/2006 | Sobb et al. | 455/414.1 |
| 2007/0124046 A1* | 5/2007 | Ayoub et al. | 701/36 |
| 2008/0015771 A1* | 1/2008 | Breed et al. | 701/207 |

* cited by examiner

MANAGEMENT OF NAMETAGS IN A VEHICLE COMMUNICATIONS SYSTEM

FIELD OF THE INVENTION

This invention relates generally to a method of managing nametag data files for speech recognition embedded in a vehicle communication system. In particular, the invention relates to transfer of multilingual nametag data files for speech recognition from one vehicle to another vehicle.

BACKGROUND OF THE INVENTION

The opportunity to personalize features in a mobile vehicle is ever increasing as the automobile is being transformed into a communications and entertainment platform as well as a transportation platform. Many new cars will be installed with some type of telematics unit to provide wireless communication and location-based services. These services may be accessed through interfaces such as voice-recognition computer applications, touch-screen computer displays, computer keyboards, or a series of buttons on the dashboard or console of a vehicle.

Currently, telematics units in mobile vehicles establish a communication channel between an in-vehicle mobile phone and a receiver phone responsive to a user speaking a nametag to identify the phone number of the receiver phone. A user programs the nametags and the related phone numbers into the telematics unit from inside the vehicle. A user can also program the nametags and the related phone numbers into the in-vehicle mobile phone or a personal mobile phone.

The telematics unit and the mobile phone include an automated speech recognition (ASR) engine to correlate the spoken nametag with a plurality of phoneme sets for a given language. The telematics unit and the mobile phone can include a plurality of ASR engines to correlate the spoken nametag with phoneme sets for a respective plurality of languages. In this embodiment, the user indicates which ASR engine to use for the language that the user is speaking. The user also programs each ASR engine for a given language with the nametags for that language.

When a user buys a new vehicle with an embedded telematics unit the user generally wants to have some or all of the nametags from the initial vehicle in the new vehicle. Currently, the user must be in the new vehicle to input the list of nametags from the previous vehicle into the new vehicle for recognition by the ASR engine. Likewise, if a user buys a new vehicle with a telematics unit and wants to have the nametags from a mobile phone in the new vehicle, the user must be in the new vehicle to input the list of nametags from the mobile phone into the new vehicle for recognition by the ASR engine. If the user wants access to several languages, then the user must be in the new vehicle to reprogram the ASR engine for each language in the new vehicle with the list of nametags in the previous vehicle or the mobile phone.

It is desirable to transfer the nametags in all language from the initial vehicle or the mobile phone to the new vehicle without requiring the user to be in the new vehicle and without requiring the user needing to recall all the nametags in the initial vehicle or mobile phone.

SUMMARY OF THE INVENTION

One aspect of the present invention provides a method for managing user nametags for a vehicle communications system, the method including receiving a nametag transfer request at a call center from a source, determining a target vehicle associated with the source based on the request and modifying a source nametag data file based on an acoustic profile of the target vehicle, wherein the source nametag data file is one of an audio file and a text file.

A second aspect of the present invention provides a system for managing user nametags for a vehicle communications system, the system including means for receiving a nametag transfer request at a call center from a source, means for determining a target vehicle associated with the source based on the request and means for modifying a source nametag data file based on an acoustic profile of the target vehicle, wherein the source nametag data file is one of an audio file and a text file.

A third aspect of the present invention provides a computer readable medium storing a computer program including computer readable code for receiving a nametag transfer request at a call center from a source, for determining a target vehicle associated with the source based on the request and for modifying a source nametag data file based on an acoustic profile of the target vehicle, wherein the source nametag data file is one of an audio file and a text file.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

Various embodiments of the present invention are illustrated by the accompanying figures, wherein.

DETAILED DESCRIPTION OF THE PRESENTLY PREFERRED EMBODIMENTS

Figure 1:
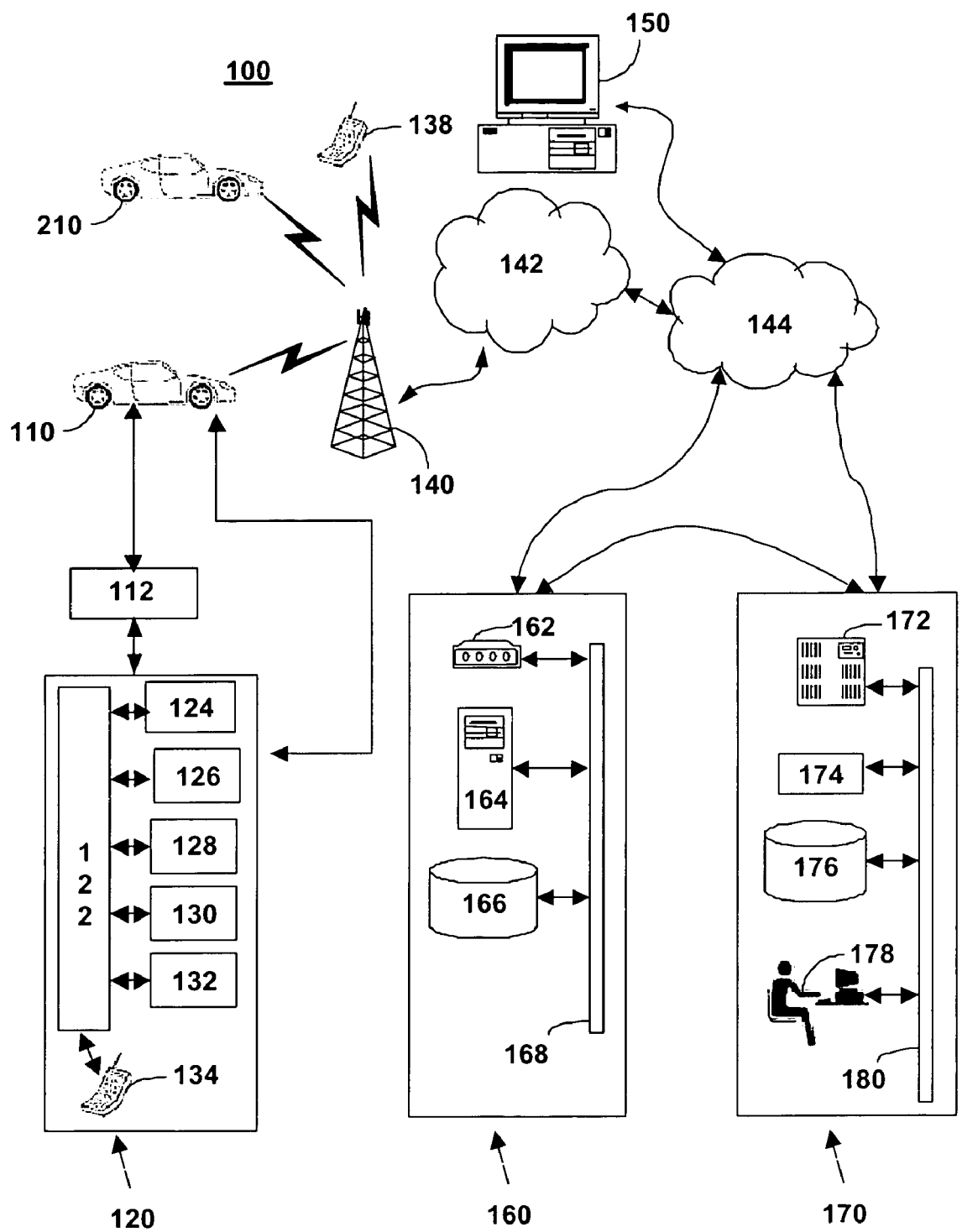
FIG. 1 is a schematic diagram of a system for providing access to a telematics system in a mobile vehicle.

FIG. 1 illustrates one embodiment of system for data transmission over a wireless communication system, in accordance with the present invention at 100. Mobile vehicle communication system (MVCS) 100 includes a mobile vehicle communication unit (MVCU) 110, a MVCU 210, a vehicle communication network 112, a telematics unit 120, one or more wireless carrier systems 140, one or more communication networks 142, one or more land networks 144, one or more client, personal or user computers 150, one or more web-hosting portals 160, one or more personal handsets 138, and/or one or more call centers 170. In one embodiment, MVCU 110 and MVCU 210 are implemented as mobile vehicles equipped with suitable hardware and software for transmitting and receiving voice and data communications. MVCS 100 may include additional components not relevant to the present discussion. Mobile vehicle communication systems and telematics units are known in the art.

MVCU 110 and MVCU 210 may also be referred to as a mobile vehicle throughout the discussion below. In operation, MVCU 110 and MVCU 210 may be implemented as motor vehicles, marine vehicles, or as aircraft. MVCU 110 and MVCU 210 may include additional components not relevant to the present discussion.

For the remainder of the discussion of FIG. 1, a reference to MVCU 110 is a reference to both MVCU 110 and MVCU 210, since MVCU 110 and MVCU 210 can differ only in their acoustic characteristics and in the installed version of automatic speech recognition (ASR) engine. In one embodiment, MVCU 110 and MVCU 210 have the same acoustic characteristics. In another embodiment, MVCU 110 and MVCU 210 have the same installed version of ASR engine. In yet another embodiment, MVCU 110 and MVCU 210 have the same acoustic characteristics and the same installed version of ASR engine.

Vehicle communication network 112 sends signals between various units of equipment and systems (detailed below) within MVCU 110 to perform various functions such as unlocking a door, opening the trunk, setting personal comfort settings, and calling from telematics unit 120. In facilitating interactions among the various communication and electronic modules, vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

MVCU 110, via telematics unit 120, sends and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, and an in-vehicle mobile phone 134. In other embodiments, telematics unit 120 may be implemented without one or more of the above listed components, such as, for example, a GPS unit 126. Telematics unit 120 may include additional components not relevant to the present discussion.

Processor 122 is implemented as a microcontroller, microprocessor, controller, host processor, or vehicle communications processor. In one embodiment, processor 122 is a digital signal processor (DSP). In an example, processor 122 is implemented as an application specific integrated circuit (ASIC). In another embodiment, processor 122 is implemented as processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type communication device, such as, for example, an analog, digital, dual-mode, dual-band, multi-mode or multi-band cellular phone.

Processor 122 executes various computer programs that control programming and operational modes of electronic and mechanical systems within MVCU 110. Processor 122 controls communications (e.g. call signals) between telematics unit 120, wireless carrier system 140, and call center 170. In one embodiment, a voice-recognition application including one or more ASR engine is installed in processor 122 that can translate human voice input through microphone 130 to digital signals. Processor 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers. In this embodiment, signals from processor 122 are translated into voice messages and sent out through speaker 132.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal or user computer 150 includes a computer usable medium to execute Internet browser and Internet-access computer programs for sending and receiving data over land network 144 and optionally, wired or wireless communication networks 142 to web-hosting portal 160. Personal or client computer 150 sends user preferences to web-hosting portal through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110. In operation, a client utilizes computer 150 to initiate setting or re-setting of user-preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations and theft alarm settings. For each client, the web server potentially stores hundreds of preferences for wireless vehicle communication, networking, maintenance and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services, including enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g. a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicate with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

A personal handset 138 is in communication with the call center 170 via one or more wireless carrier systems 140, one or more communication networks 142, one or more land networks 144, one or more client, personal or user computers 150, and one or more web-hosting portals 160. The personal handset 138 includes nametag data files as either text files or audio files and can be a mobile phone or a personal digital assistant (PDA). In-vehicle mobile phone 134 or personal handset 138 is a cellular-type communication device, such as, for example, an analog, digital, dual-mode, dual-band, multi-mode or multi-band cellular phone.

The methods 200-1200 described below with reference to FIGS. 2-12, respectively, together form a complete method for managing user nametags for a vehicle communication system. The method describes how to generate and sort nametag tables for multiple languages. The method additionally describes how to transfer the generated nametag tables from a source to a target vehicle that has different acoustic characteristics. The transfer includes modifying the acoustic characteristics of the nametag table in order to enhance the recognition capability of a speech recognition unit in the target vehicle when a user announces phrases from the nametag table in the target vehicle.

Figure 2:
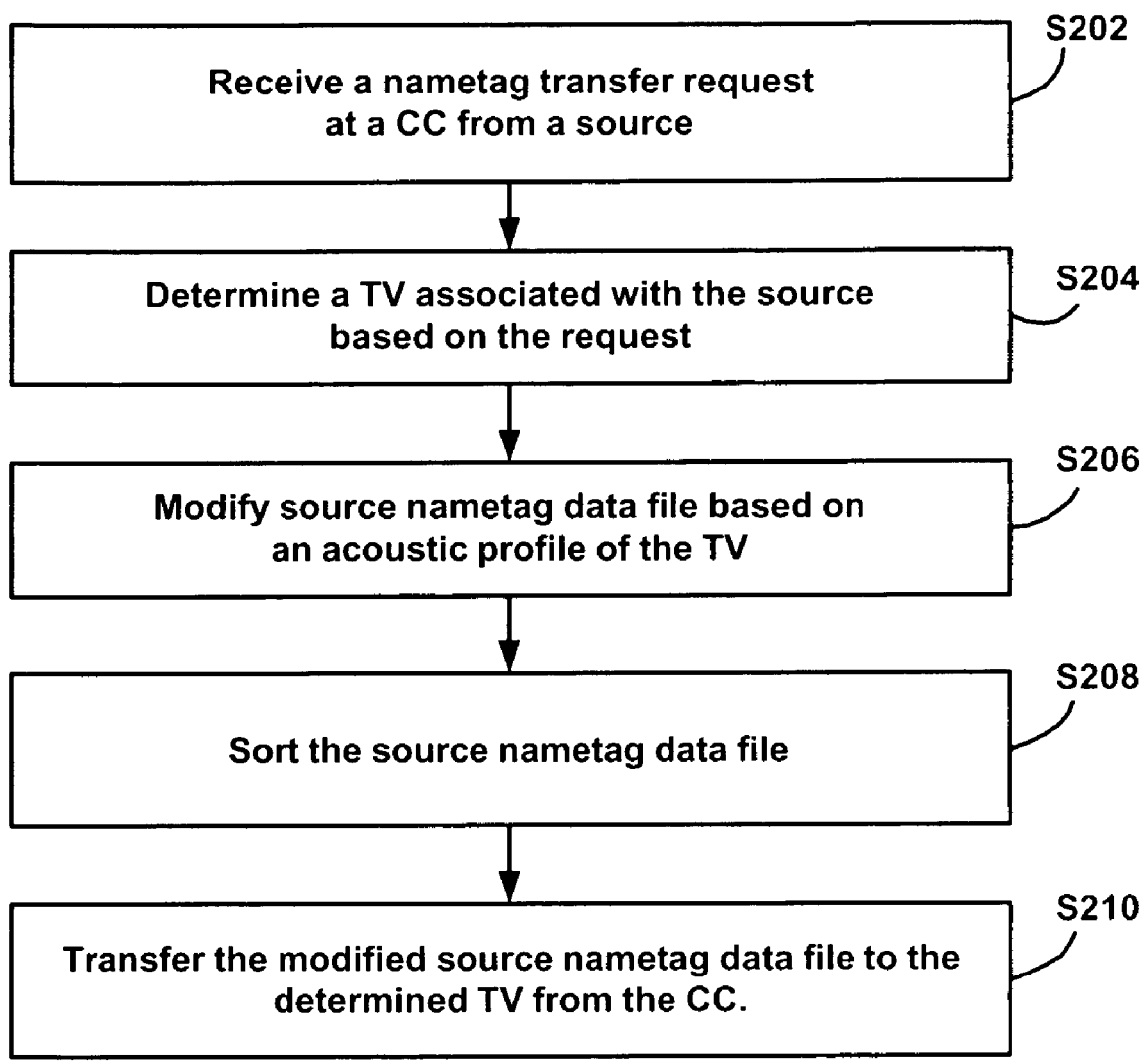
FIG. 2 illustrates a method of managing user nametags for a vehicle communications system in accordance with the present invention.

FIG. 2 illustrates a method 200 of managing user nametags for a vehicle communications system in accordance with the present invention. The call center 170, the target vehicle 210, the telematics unit 120, the processor 122, and the source, such as the MVCU 110, the in-vehicle mobile phone 134 and/or the personal handset 138, have stored in computer readable medium at least one computer program including computer readable code to perform the operations described with reference to method 200.

During stage S202, a nametag transfer request is received at the call center (CC) 170 from a source. The source can be the MVCU 110, the personal handset 138, or the in-vehicle mobile phone 134. The terms MVCU 110 and source 110 are used interchangeably throughout this document to describe a generic source including a vehicle, a personal handset or an in-vehicle mobile phone. For some embodiments, the source is the personal handset 138 or the in-vehicle mobile phone 134. In that case, the personal handset 138 and the in-vehicle mobile phone 134 are referred to as source 138 and source 134, respectively. For other embodiments, the source is the MVCU 110. In that case, MVCU 110 is referred to as source vehicle 110.

The nametag transfer request is transmitted to the call center 170 via one or more wireless carrier systems 140, one or more communication networks 142, one or more land networks 144, one or more client, personal or user computers 150, one or more web-hosting portals 160. The nametag transfer request includes at least a selection of source nametag data files to be transferred, a source identifier, and a target vehicle identifier. The target vehicle 210 is the MVCU 210 to which the source nametag data files are to be transferred. The phrases MVCU 210 and target vehicle 210 are used interchangeably throughout this document. The method of receiving the nametag transfer request is described in detail below in reference to method 700 of FIG. 7.

During stage S204, the call center 170 determines a target vehicle (TV) 210 associated with the source based on the nametag transfer request. The target vehicle 210 is associated with the source by the target vehicle identifier included in the nametag transfer request. The determination of the target vehicle 210 includes receiving an acoustic profile of the target vehicle 210. The method of determining the target vehicle 210 is described in detail below in reference to method 800 of FIG. 8.

During stage S206, the call center 170 modifies the source nametag data file based on the acoustic profile of the target vehicle (TV) 210. The source nametag data file is an audio file or a text file. The modifying includes forming multilingual tables, if the user initiating the nametag transfer request selects to communicate in more than one language. Several embodiments of modifying the nametag data file are possible depending on the source 110, 134 or 138, the type of data file (audio or text), the ASR engine in the source 110,134 or 138, the ASR engine in the target vehicle 210, the acoustic profile of the source vehicle 110, and the acoustic profile of the target vehicle 210. The methods 900-1100 described below with reference to FIGS. 9-11, respectively, provide details for three embodiments of the method for modifying the source nametag data file.

Figure 3:
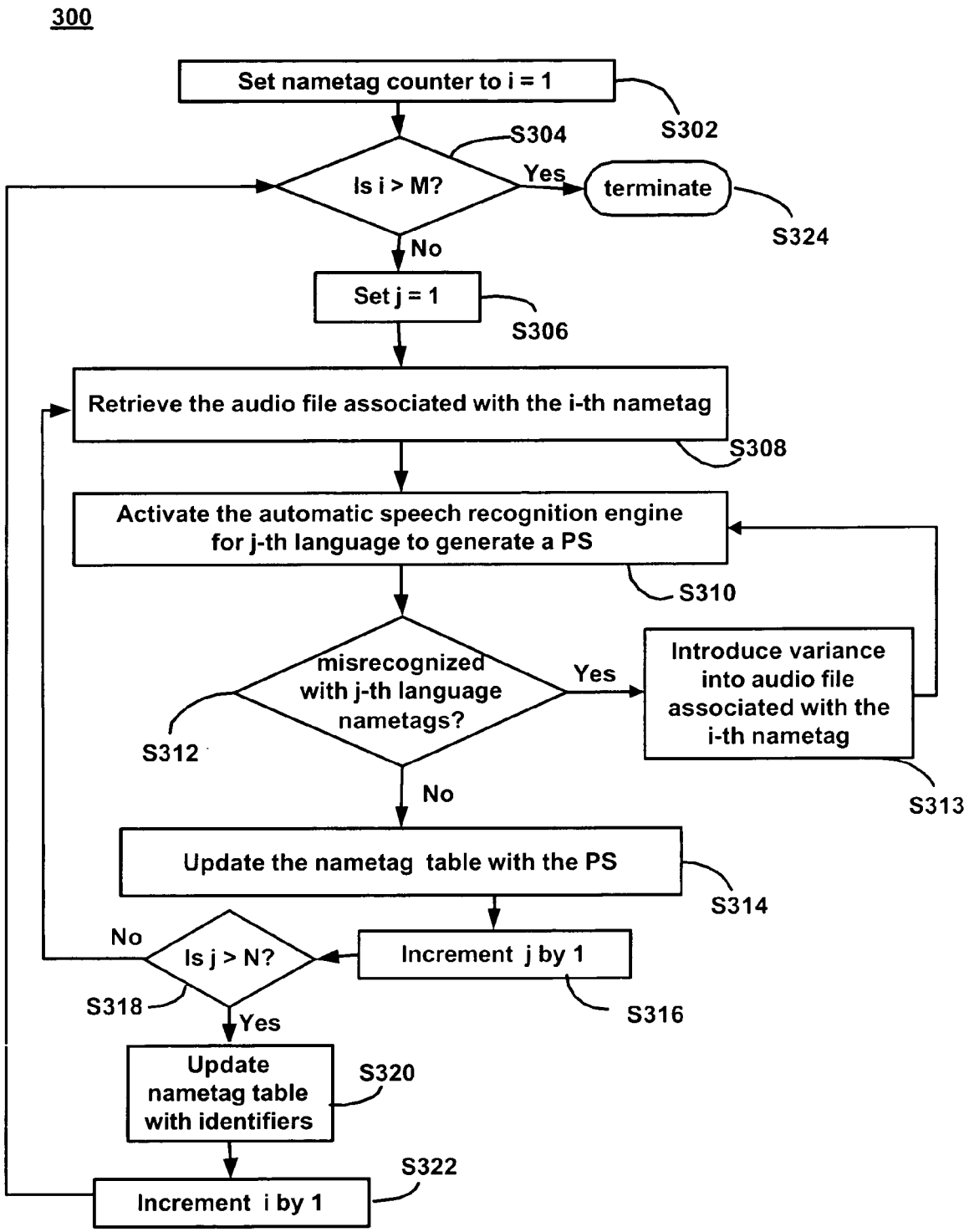
FIG. 3 illustrates a method of sorting source nametag data files in accordance with the present invention.

During stage S208, the call center 170 sorts the source nametag data file. The source nametag data file is sorted based on unilingual phonemes for one language if one language is selected by the user. The source nametag data file is sorted based on multilingual phonemes having characteristics of more than one language, or multilingual phonemes having universal characteristics if more than one language is selected by the user. The method 300 described below with reference to FIG. 3 provides details about one embodiment of sorting multilingual phonemes having characteristics of more than one language. A universal language ASR engine sorts the source nametag data file according to universal characteristics.

During stage S210, the call center 170 transfers the modified source nametag data file to the target vehicle 210 determined during stage S204. The source nametag data file has been modified to include the acoustics of the target vehicle 210 to provide a nametag data file that the ASR engine in the target vehicle 210 can recognize with a low error rate.

FIG. 3 illustrates a method 300 of sorting source nametag data files in accordance with the present invention. In this embodiment, the user selected to sort M nametags into a table for N languages. Each nametag is operated on by a first language ASR engine to generate the phoneme set for the first language and then the nametag is operated on by the second language ASR engine to generate a phoneme set for the second language. The process is repeated for the N languages and the M nametags to generate TABLE 1 for M nametags and N languages as shown below. In TABLE 1, PS_MN refers to phoneme set for the $M^{th}$ nametag in the $N^{th}$ language.

TABLE 1

| Vehicle, VR Engine, Speaker Identification Tags | | | | |
|---|---|---|---|---|
| Nametags | Language Tags | | | |
| (audio file) | 1 | 2 | 3 | ... N |
| 1 | PS_11 | PS_12 | PS_13 | ... PS_1N |
| 2 | PS_21 | PS_22 | PS_23 | ... PS_2N |
| 3 | PS_31 | PS_32 | PS_33 | ... PS_3N |
| ... | ... | ... | ... | ... |
| M | PS_M1 | PS_M2 | PS_M3 | ... PS_MN |

PS_MN → M-th nametag phone sequences in N-th language

The call center 170, one or more communication services managers 174, and one or more communication services databases 176 have stored in computer readable medium at least one computer program including computer readable code to perform the operations described with reference to method 300. The communication services managers 174, include one or more processors (not shown) to perform the operations described herein.

During stage S302, communication services manager 174 sets i equal to one (1) in the nametag counter to initiate the sorting process of a source nametag data file. The M number of nametags and the N languages were received at the call center 170. N and M are also set as part of the initiating process. During stage S304, communication services manager 174 compares i with M to determine if i is greater than M, the maximum number of nametags to be sorted. If i is greater than M, the method 300 proceeds to stage S324 and the method 300 is terminated. If i is equal to or less than M, the method 300 proceeds to stage S306.

During stage S306, the communication services manager 174 sets j equal to one (1). During stage S308, the communication services manager 174 retrieves the audio file of the $i^{th}$ nametag stored in one and more communication services databases 176 in the call center 170. The phone number and the audio file of the $i^{th}$ nametag are stored as a linked data in the communication services databases 176. In one embodiment, the phone number and the linked audio file of the nametags are received with the nametag transfer request described above with reference to stage S202 of method 200 in FIG. 2.

During stage S310, the communication services manager 174 activates the ASR engine for the $j^{th}$ language to generate a phoneme set (PS) for the nametag in the $j^{th}$ language. ASR engines are located in one or more communication services databases 176 in the call center 170 and include the hardware and software to generate phoneme sets.

During stage S312, the communication services manager 174 determines if the phoneme set generated during stage S310 is misrecognized with any of the language nametags previously generated in the nametag table. The communication services manager 174 compares the previously generated phoneme sets for the $j^{th}$ language with the currently generated phoneme set.

If the phoneme sets are misrecognized, the method 300 proceeds to stage S313. During stage S313, the communication services manager 174 introduces variance into the audio file associated with the $i^{th}$ nametag. The communication services manager 174 applies a variance algorithm to the audio file associated with the $i^{th}$ nametag. The variance algorithm can change the amplitude in the audio file by a preset amount for one or more frequencies and/or one or more ranges of frequency. Alternatively, the variance algorithm can shift the frequency in the audio file by a preset amount for one or more frequencies and/or one or more ranges of frequency. In one embodiment, the variance algorithm shifts the frequency and changes the amplitude in the audio file by preset amounts for one or more frequencies and/or one or more ranges of frequency. The variance algorithm can be dependent upon the language.

In one embodiment, the communication services manager 174 retrieves the variance algorithm for the audio file from one or more communication services databases 176. In another embodiment, the communication services manager 174 retrieves the variance algorithm for the audio file from the ASR engine for the $j^{th}$ language. Once the variance algorithm is applied to the audio file, the method 300 returns to stage S310 and the communication services manager 174 activates the ASR engine for the $j^{th}$ language to generate a phoneme set (PS) for the nametag in the $j^{th}$ language.

If the phoneme sets are not misrecognized during stage S312, the method 300 proceeds to stage S314. During stage S314, the communication services manager 174 updates the nametag table with the currently generated phoneme set (PS) by adding the phoneme set for the $i^{th}$ nametag in the $j^{th}$ language to the nametag table. During stage S316, the communication services manager 174 increments j by one (1).

During stage S318, the communication services manager 174 determines if j is greater than N, which is the maximum number of languages in the nametag table. If j is equal to or less than N, the method 300 proceeds to stage S308 and the method proceeds through stages S308 to S318 as described above. If j is greater than N, the method 300 proceeds to stage S320. During stage S320, the communication services manager 174 updates the nametag table with identifiers as required for the nametag table format. The identifiers include the phone number, which is appended to the row of the linked nametag. During stage S322, the communication services manager 174 increments i by one (1) and the method 300 proceeds to stage S304. During stage S304 the communication services manager 174 determines if i is greater than M and the method 300 proceeds as described above.

In this manner, the phoneme sets for each nametag in all the selected languages are generated and added to the nametag table to form the nametag table, shown in exemplary TABLE 1. In one embodiment, the method 300 generates nametags for one language, activates the ASR engine for the next language and generates all the nametags in the next language and so forth, as is understandable by those of ordinary skill in the art.

Figure 4:
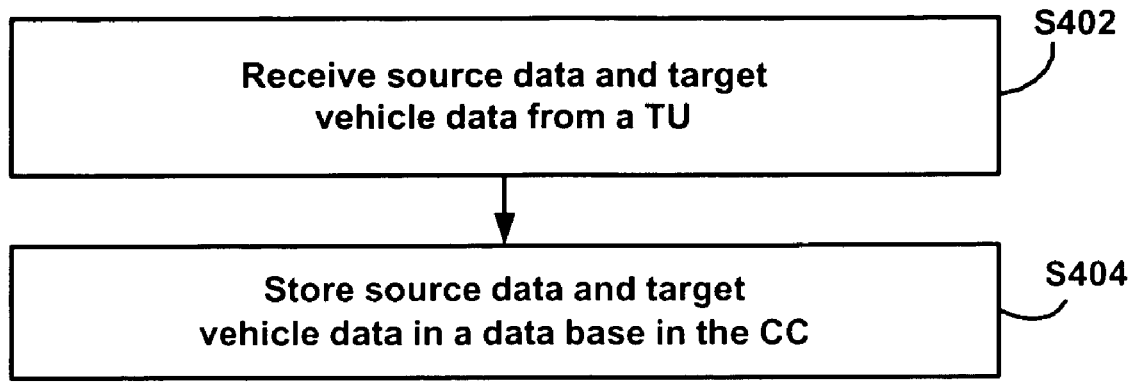
FIGS. 4 and 5 illustrate method of receiving source data and target vehicle data in accordance with the present invention.
Figure 5:
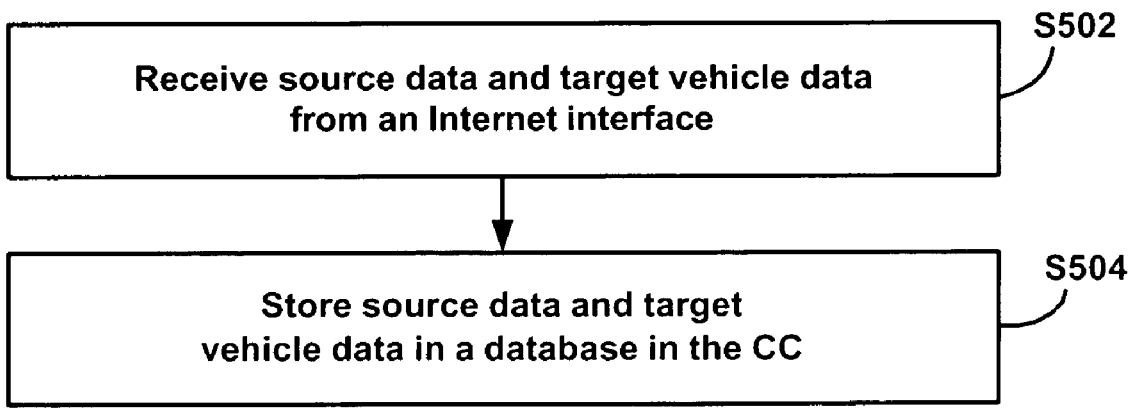

FIGS. 4 and 5 illustrate respective methods 400 and 500 of receiving source data and target vehicle data in accordance with the present invention for storage in one or more communication services databases 176 in the call center 170. At least portions of the stored source data and target vehicle data are retrieved when a nametag transfer request is received at the call center 170. The call center 170, the telematics unit 120, the processor 122, and the source, such as an MVCU 110, in-vehicle mobile phone 134 or personal handset 138, have stored in computer readable medium at least one computer program including computer readable code to perform the operations described with reference to methods 400 and 500. Method 400 describes how to receive data from a telematics unit 120. Method 500 describes how to receive data from an Internet interface.

In method 400 during stage S402, the call center 110 receives source data and target vehicle data from a telematics unit 120.

The target vehicle data includes a target vehicle identification, the acoustic profile of the target vehicle 210 and a target vehicle speech recognition identifier. The target vehicle identification can be the vehicle identification number (VIN) of the target vehicle 210. The acoustic profile of the target vehicle 210 includes an audio data file of the acoustic characteristics for the target vehicle 210. When the acoustic characteristics for the target vehicle 210 are added to the audio data file of a phrase spoken in a noise-free environment, the modified audio file is similar to the audio file of the same phrase spoken in the target vehicle 210. The target vehicle speech recognition identifier is a code that identifies the version of ASR engine used in the speech recognition unit in the target vehicle 210.

If the source is the source vehicle 110, the source data is source vehicle data, which includes a source identification, an acoustic profile of the source vehicle 110, and a source vehicle speech recognition identifier. The source identification can be the vehicle identification number (VIN) of the source vehicle 110. The acoustic profile of the source vehicle 110 includes an audio data file of the acoustic characteristics for the source vehicle 110. When the acoustic characteristics for the source vehicle 110 are added to the audio data file of a phrase spoken in a noise-free environment, the modified audio file is similar to the audio file of the same phrase spoken in the source vehicle 110. The source vehicle speech recognition identifier is a code that identifies the version of ASR engine used in the speech recognition unit in the source vehicle 110.

The acoustic profile of the target vehicle 210 and the acoustic profile of the source vehicle 110 can be retrieved from target vehicle data and source data that includes the year, make, and model of the target vehicle 210 and source vehicle 110, respectively. In this case, the communication services manager 174 uses a lookup table in the communication services databases 176 in the call center 170. The lookup table links the vehicle year, make, and model to an acoustic profile. In one embodiment, the lookup table links the target vehicle identification with a target vehicle's year, make, model and acoustic profile and the lookup table links the source identification with a source vehicle's year, make, model and acoustic profile.

The target vehicle speech recognition identifier and the source vehicle speech recognition identifier can be retrieved from target vehicle data and source vehicle data that includes the year, make and model of the target vehicle 210 and source vehicle 110, respectively. In this case, the communication services manager 174 uses a lookup table in the communication services databases 176 in the call center 170. The lookup table links the vehicle year, make, and model to speech recognition identifier. In one embodiment, the lookup table links the target vehicle identification with a target vehicle's year, make, model and acoustic profile and the lookup table links the source identification with a source vehicle's year, make, model and acoustic profile. In one embodiment, a lookup table links the vehicle year, make, and model, speech recognition identifier and acoustic profile with the target vehicle target vehicle identification and/or source identification.

The source vehicle data can include the source nametag data file stored in the in-vehicle memory 138 of the telematics unit 120 in the source vehicle 110. In this embodiment, the source vehicle data is retrieved from the in-vehicle memory 138 by the processor 120 in the telematics unit 120 and transmitted to the call center 170 via one or more wireless carrier systems 140, one or more communication networks 142, and/or one or more land networks 144. In one embodiment, the source nametag data file is stored in the call center 170, and is periodically updated to include recently added nametags input by the user at the telematics unit 120. In that case, the call center 170 periodically requests that updates to the nametag data in the telematics unit 120 be transferred to the call center 170, as is understandable by those of ordinary skill in the art. In one embodiment, the telematics unit 120 transmits updates to the nametag data file at the call center 170 each time the user adds a new nametag to the nametag data file in the telematics unit 120.

If the source is a personal handset 138 or an in-vehicle mobile phone 134, the source data includes a source identification, and a source speech recognition identifier. The source identification is operable to uniquely identify the source 134 or source 138 and can be an electronic serial number of a mobile phone or a PDA. The source speech recognition identifier is a code that identifies the version of ASR engine used in the source 134 or source 138.

In one embodiment, the source data includes the source nametag data file currently stored the source 134 or source 138. The source data stored in a memory (not shown) in the personal handset 138 or the in-vehicle mobile phone 134 can be downloaded to the telematics unit 120 in data packets. The telematics unit 120 is triggered by information on the received data packet headers to transmit the received source data to the call center 170. The source data is transmitted to the call center 170 from the telematics unit 120 via one or more wireless carrier systems 140, and/or one or more communication networks 142, one or more land networks 144.

In one embodiment, source data is transmitted from more than one of the source vehicle 110, the personal handset 138, or the in-vehicle mobile phone 134 to the call center 170 via the telematics unit 120.

During stage S404, the source data and target vehicle data are stored in the one or more communication services databases 176 in the call center 170. In one embodiment, the target vehicle data is not stored in the call center 170 but is received with a nametag transfer request.

In method 500 during stage S502, the call center 170 receives source data and target vehicle data from an Internet interface. A user or a vehicle dealership (not shown) initiates the Internet interface. The vehicle dealership sells MVCUs 110 and MVCUs 210 to users. In some cases the sales person at the vehicle dealership enters the source data and target vehicle data via the Internet interface when the MVCU 110 or MVCU 210 is sold. The target vehicle data includes a target vehicle identification, the acoustic profile of the target vehicle and a target vehicle speech recognition identifier as described above with reference to stage S402 of method 400 in FIG. 4. The source data includes one or more of the source identification, the acoustic profile of the source vehicle 110, the source speech recognition identifier, and the source nametag data file currently stored in the source 110. As described above with reference to stage S402 of method 400 in FIG. 4, the source data is from the source vehicle 110, the personal handset 138, or the in-vehicle mobile phone 134. The source data and the target vehicle data are transmitted to the call center 170 from the Internet interface via one or more wireless carrier systems 140, one or more communication networks 142, one or more land networks 144, one or more client, personal or user computers 150, and/or one or more web-hosting portals 160. The method of transmitting data to the call center 170 from an Internet interface is described in detail below with reference to method 600 of FIG. 6.

During stage S504, the source data and target vehicle data are stored in the one or more communication services databases 176 in the call center 170. In one embodiment, the target vehicle data is not stored in the call center 170 but is received with a nametag transfer request.

Figure 6:
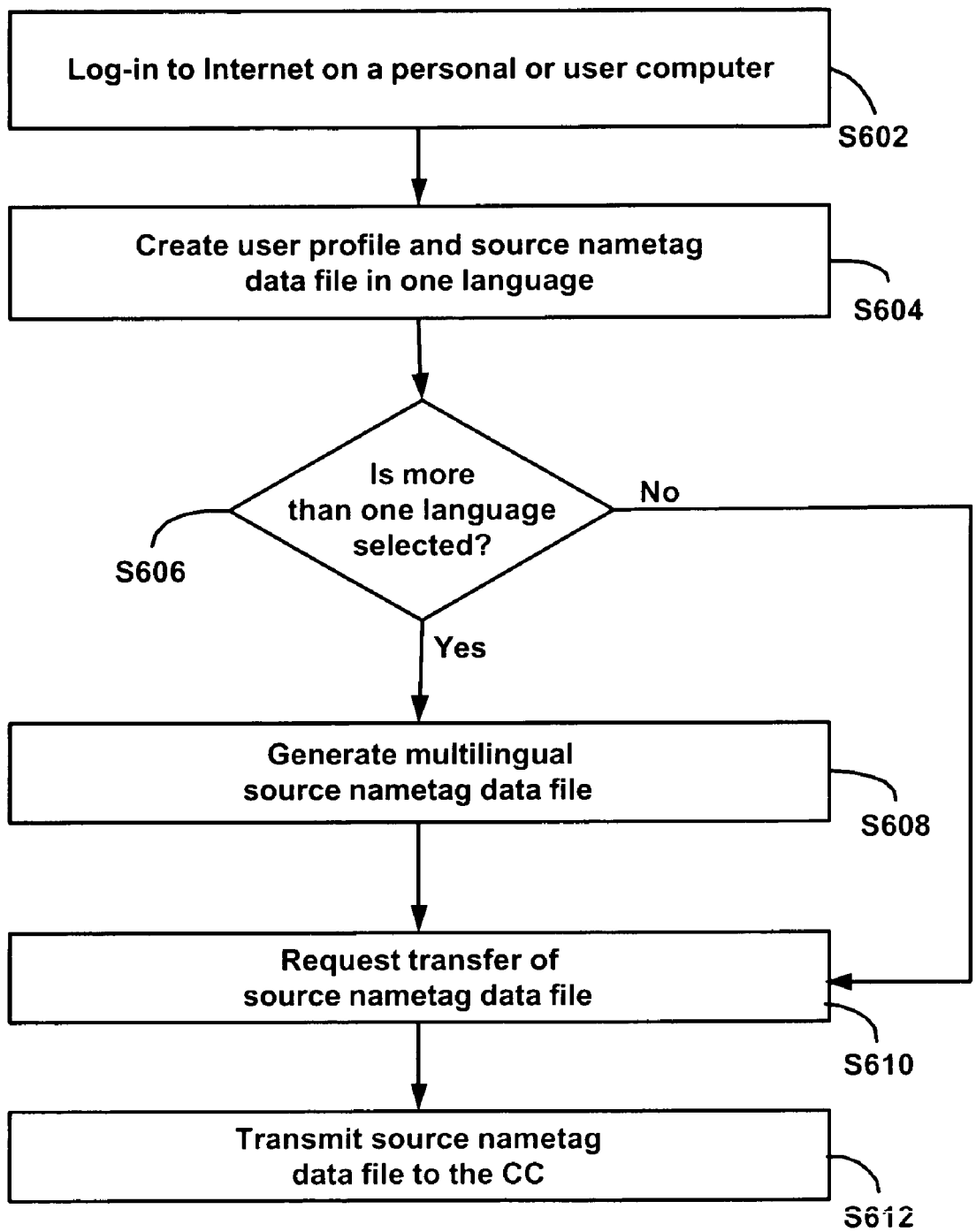
FIG. 6 illustrates a method of providing data in accordance with the present invention.

FIG. 6 illustrates a method of providing a source nametag data file via an Internet interface for transmission to the call center 170 in accordance with the present invention. The personal or user computer 150 has stored in computer readable medium at least one computer program including computer readable code to perform the operations described with reference to method 600.

During stage S602, the user logs-on to the Internet using a personal or user computer 150 to request a nametag transfer. During stage S604, the user creates and enters a user profile and a source nametag data file in one language into the personal or user computer 150.

The user profile includes a user identifier and a selection of one or more languages for the nametags. The user identifier is stored at the call center 170 and linked in a lookup table to user information including, for example, the year, make and model of the MVCU 110 of the user, the name and address of the user, and selected user preferences.

The source nametag data file includes the nametags and associated phone numbers, which the user announces into a microphone (not shown) at the personal or user computer 150 upon receiving prompts from an algorithm in the personal or user computer 150. An algorithm in personal or user computer 150 generates an audio file for each nametag and links it with the associated phone number. In one embodiment, the user enters the user profile and the source nametag data file into the personal or user computer 150 using finger strokes on a computer keyboard (not shown) to generate text files for each nametag and phone number. The entered user profile and the source nametag data file are saved in a memory (not shown) in the personal or user computer 150.

During stage S606, in response to the user entering a user profile and the source nametag data file, an algorithm in the personal or user computer 150 determines if the user selected to generate the source nametag data file in more than one language by checking the value of a data field in the user profile. If the user selected more than one language for the source nametag data file, the method 600 proceeds to stage S608. During stage S608, an algorithm in the personal or user computer 150 generates the multilingual source nametag data file including phoneme sets for each nametag in each language, as described above with reference to method 300 of FIG. 3. During stage S610, the user enters a request for the transfer of the source nametag data file generated during stage S606.

If during stage S606 the algorithm in the personal or user computer 150 determines that the user did not select more than one language for the source nametag data file, the method 600 proceeds to stage S610 and the user requests the transfer of the source nametag data file as entered into the personal or user computer 150 during stage S604. In one embodiment, the user places the transfer request when the user profile and the source nametag data file are entered into the personal or user computer 150.

During stage S612, the personal or client computer 150 transmits the source nametag data file to the call center (CC) 170 responsive to the nametag transfer request. Personal or client computer 150 sends the source nametag data file to web-hosting portal 160 through a web-page interface using communication standards such as hypertext transport protocol (HTTP), and transport-control protocol and Internet protocol (TCP/IP). Web-hosting portal 160 transmits the source nametag data file by wire or IP network to call center 170. In one embodiment, web-hosting portal 160 transmits the source nametag data file by phone lines to land network 144 to call center 170. In one embodiment, the source nametag data file is stored at web-hosting portal 160.

Figure 7:
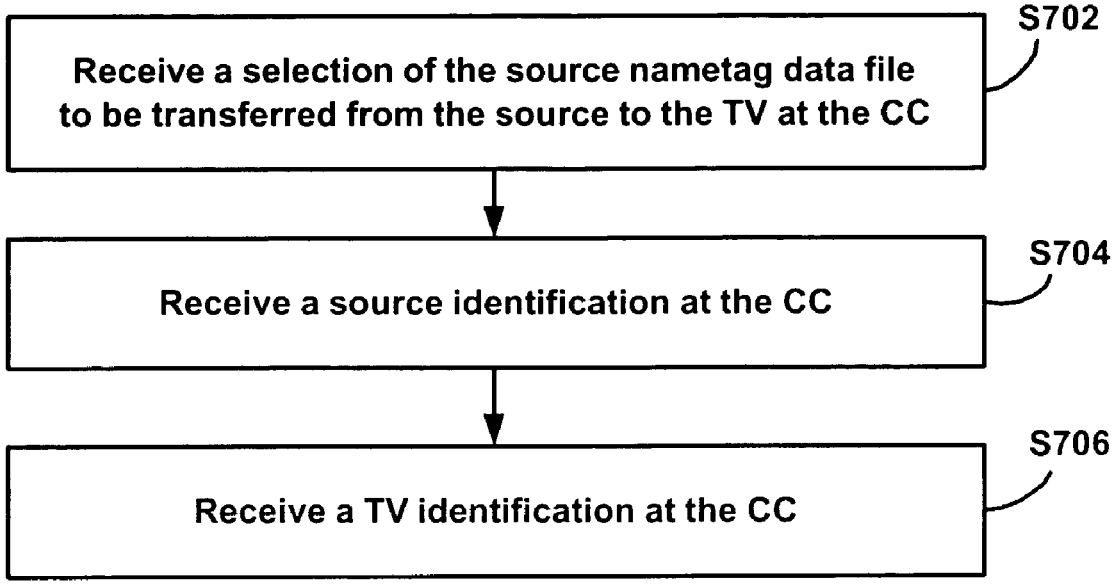
FIG. 7 illustrates a method of receiving a nametag transfer request in accordance with the present invention.

FIG. 7 illustrates a method 700 of receiving a nametag transfer request in accordance with the present invention. The call center 170 has stored in computer readable medium at least one computer program including computer readable code to perform the operations described with reference to method 700.

During stage S702, the call center (CC) 170 receives a selection of the source nametag data file. The user selected source nametag data file is a first component of the nametag transfer request. The selected source nametag data file is part or all of the nametag data file currently stored at the source 110.

During stage S704, the call center (CC) 170 receives a source identification. The source identification is a second component of the nametag transfer request. During stage S706, the call center (CC) 170 receives a target vehicle identification. The target vehicle identification is a third component of the nametag transfer request. The source identification and target vehicle identification were described above with reference to stage S402 of method 400 in FIG. 4. The selection of the source nametag data file, the source identification and the target vehicle identification are received with instructions to transfer the selected source nametag data file to the target vehicle 210.

In one embodiment, the nametag transfer request does not include a selection of the source nametag data file. In that embodiment, the complete source nametag data file is retrieved from one or more communication services databases 176 in response to receiving the nametag transfer request. In this case, the complete source nametag data file is stored in the call center 170, according to the methods 400 and 500 described above with reference to FIGS. 4 and 5, respectively.

Figure 8:
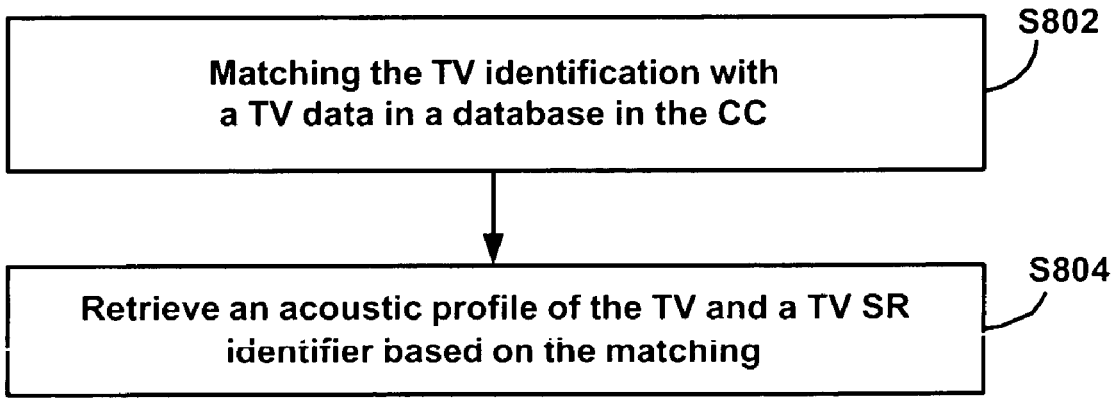
FIG. 8 illustrates a method of determining a target vehicle in accordance with the present invention.

FIG. 8 illustrates a method 800 of determining a target vehicle 210 in accordance with the present invention. The call center 170 has stored in computer readable medium at least one computer program including computer readable code to perform the operations described with reference to method 800.

During stage S802, the call center 170 matches the target vehicle (TV) identification with the target vehicle (TV) data in one or more communication services databases 176 in the call center 170. The communication services manager 174, having received the target vehicle identification with the nametag transfer request, searches for a match to the target vehicle identification in the communication services databases 176.

During stage S804, the communication services manager 174 retrieves the acoustic profile of the target vehicle 210 and a target vehicle speech recognition identifier, which are linked to the matched target vehicle identification. In embodiments in which the target vehicle data is not stored in the call center 170, the data transfer request includes the acoustic profile of the target vehicle 210 and a target vehicle speech recognition identifier.

Figure 9:
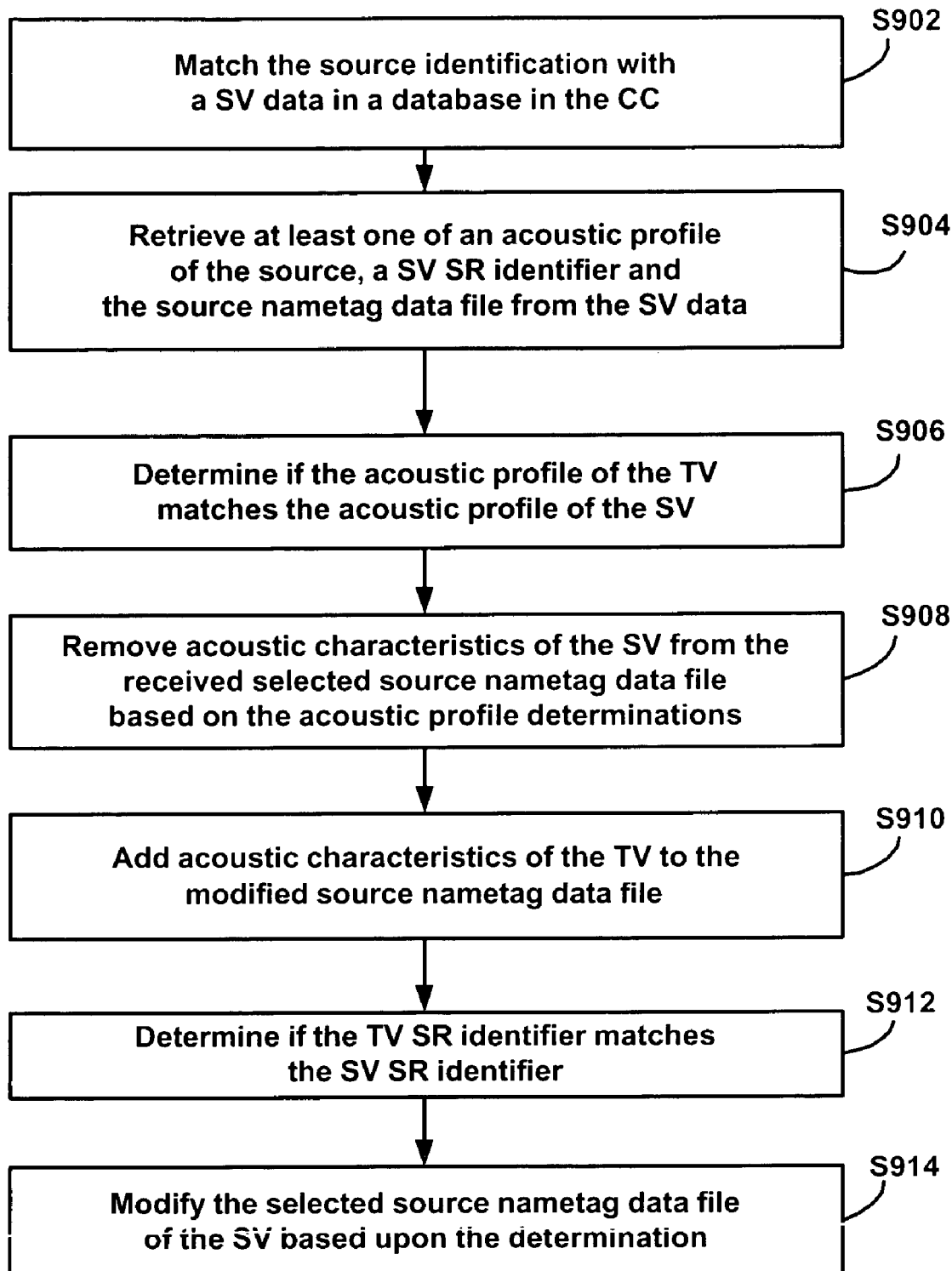
FIG. 9 illustrates a first embodiment of a method of modifying a source nametag data file in accordance with the present invention.

FIG. 9 illustrates a first embodiment of a method 900 of modifying a source nametag data file in accordance with the present invention. The call center 170 has stored in computer readable medium at least one computer program including computer readable code to perform the operations described with reference to method 900. In this embodiment, the source is a source vehicle 110 in which the source nametag data file is an audio file.

During stage S902, communication services manager 174 in the call center (CC) 170 matches the source identification, received during stage S704 described above with reference to method 700 of FIG. 7, with a source vehicle (SV) data stored in communication services databases 176 in the call center 170. The source identification is linked to the other source vehicle data, which includes the acoustic profile of the source vehicle 110, and the source vehicle speech recognition identifier. The source identification is also linked to the source nametag data file if that was part of the source vehicle data.

During stage S904, the communication services manager 174 in the call center 170 retrieves at least one of the acoustic profile of the source vehicle 110, the source vehicle (SV) speech recognition (SR) identifier, and the source nametag data file from the source vehicle (SV) data stored in the communication services databases 176. The source vehicle speech recognition identifier is used to identify the version of the ASR engine in the source vehicle 110.

During stage S906, the communication services manager 174 in the call center 170 determines if the acoustic profile of the target vehicle (TV) 210 matches the acoustic profile of the source vehicle 110, which was retrieved during stage S804 in method 800 of FIG. 8.

During stage S908, the communication services manager 174 in the call center 170 removes the acoustic characteristics of the source vehicle (SV) 110 from the received selected source nametag data file based on the acoustic profile determinations of stage S906. If the acoustic profile of the target vehicle 210 matches the acoustic profile of the source vehicle 110, the received selected source nametag data file is not modified. If the acoustic profile of the target vehicle 210 mismatches the acoustic profile of the source vehicle 110, then the acoustic characteristics of the source vehicle 110 are removed from nametags in the received selected source nametag data file to form a modified source nametag data file. The acoustic profile of the source vehicle 110 includes an audio data file in which the acoustic characteristics of the source vehicle 110 are embedded. The acoustic characteristics of the source vehicle 110 include the noise generated by the source vehicle 110 when the source vehicle 110 is in the idle condition. The communication services manager 174 applies an algorithm to the acoustic profile of the source vehicle 110 to obtain the acoustic characteristics of the source vehicle 110. In one embodiment, the acoustic profile of the source vehicle 110 is the acoustic characteristics of the source vehicle 110.

During stage S910, the communication services manager 174 in the call center 170 adds the acoustic characteristics of the target vehicle (TV) 210 to the modified selected source nametag data file, if the acoustic profile of the source vehicle 110 was determined to differ from the acoustic profile of the target vehicle 210 during stage S906. The acoustic profile of the target vehicle 210 includes an audio data file in which the acoustic characteristics of the target vehicle 210 are embedded. The acoustic characteristics of the target vehicle 210 include the noise generated by the target vehicle 210 when the target vehicle 210 is in the idle condition. The communication services manager 174 applies an algorithm to the acoustic profile of the target vehicle 210 to obtain the acoustic characteristics of the target vehicle 210. In one embodiment, the acoustic profile of the target vehicle 210 is the acoustic characteristics of the target vehicle 210. The modification of the selected source nametag data file increases the probability of the ASR engine in the target vehicle 210 recognizing phrases spoken by a user in the source vehicle 120.

During stage S912, the communication services databases 176 in the call center 170 determines if the target vehicle (TV) speech recognition (SR) identifier matches the source vehicle (SV) speech recognition (SR) identifier. During stage S914, the communication services databases 176 in the call center 170 modifies the selected source nametag data file of the source vehicle (SV) 110 based on the determination made during stage S912.

If the target vehicle speech recognition identifier matches the source vehicle speech recognition identifier, the selected source nametag data file is not modified. If the target vehicle speech recognition identifier does not match the source vehicle speech recognition identifier, the selected source nametag data file is modified so that the selected source nametag data file is compatible with the version of the ASR engine in the target vehicle 210.

Figure 10:
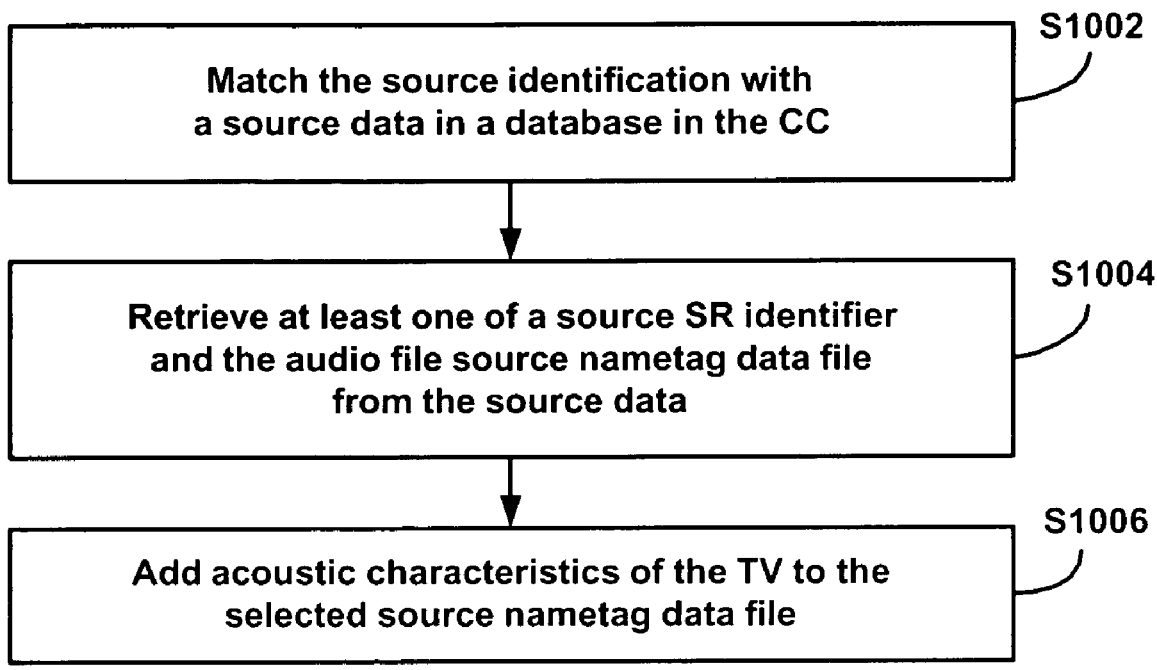
FIG. 10 illustrates a second embodiment of a method of modifying a source nametag data file in accordance with the present invention.

FIG. 10 illustrates a second embodiment of a method 1000 of modifying a source nametag data file in accordance with the present invention. In this embodiment, the source is a personal handset 138 or an in-vehicle mobile phone 134 in which the source nametag data file is an audio file. The call center 170 has stored in computer readable medium at least one computer program including computer readable code to perform the operations described with reference to method 1000.

During stage S1002, the communication services manager 174 in the call center (CC) 170 matches the source identification, received during stage S704 described above with reference to method 700 of FIG. 7, with a source data stored in communication services databases 176 in the call center 170. The source identification is linked to the other source data, which includes the source speech recognition identifier and may include the source nametag data file.

During stage S1004, the communication services manager 174 in the call center 170 retrieves at least one of the source speech recognition (SR) identifier, and the audio file source nametag data file from the source data stored in the communication services databases 176.

During stage S1006, the communication services manager 174 in the call center 170 adds the acoustic characteristics of the target vehicle (TV) 210 to the selected source nametag data file. The method of adding acoustic characteristics of the target vehicle 210 to a nametag data file was described above in reference to stage S910 of method 900 in FIG. 9.

Figure 11:
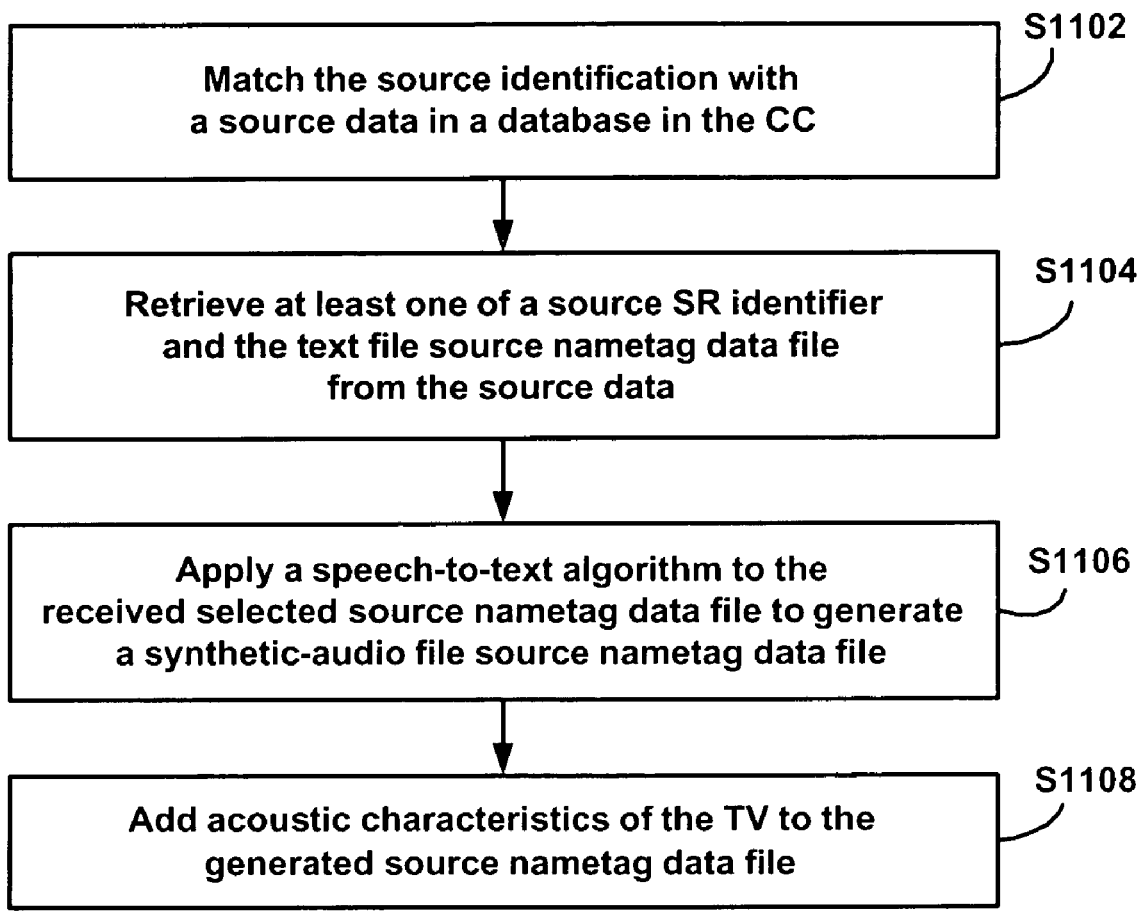
FIG. 11 illustrates a third embodiment of a method of modifying a source nametag data file in accordance with the present invention.

FIG. 11 illustrates a third embodiment of a method 1100 of modifying a source nametag data file in accordance with the present invention. In this embodiment, the source is a personal handset 138 or an in-vehicle mobile phone 134 in which the source nametag data file is a text file. The call center 170 has stored in computer readable medium at least one computer program including computer readable code to perform the operations described with reference to method 1100.

During stage S1102, the communication services manager 174 in the call center (CC) 170 matches the source identification, received during stage S704 described above with reference to method 700 of FIG. 7, with a source data stored in communication services databases 176 in the call center 170. The source identification is linked to the other source data, which includes the source speech recognition identifier and may include the source nametag data file.

During stage S1104, the communication services manager 174 in the call center 170 retrieves at least one of the source speech recognition (SR) identifier, and the text file source nametag data file from the source data stored in the communication services databases 176.

During stage S1106, the communication services manager 174 in the call center 170 applies a text-to-speech algorithm to the received selected source nametag data file to generate a synthetic-audio file source nametag data file. In one embodiment, the call center 170 determines if the user of the target vehicle 210 is a male or female and generates a respective synthetic-male audio file or a synthetic-female audio file.

During stage S1108, the communication services manager 174 in the call center 170 adds the acoustic characteristics of the target vehicle (TV) 210 to the generated synthetic-audio file source nametag data file. The method of adding acoustic characteristics of the target vehicle 210 to a nametag data file was described above in reference to stage S910 of method 900 in FIG. 9.

Figure 12:
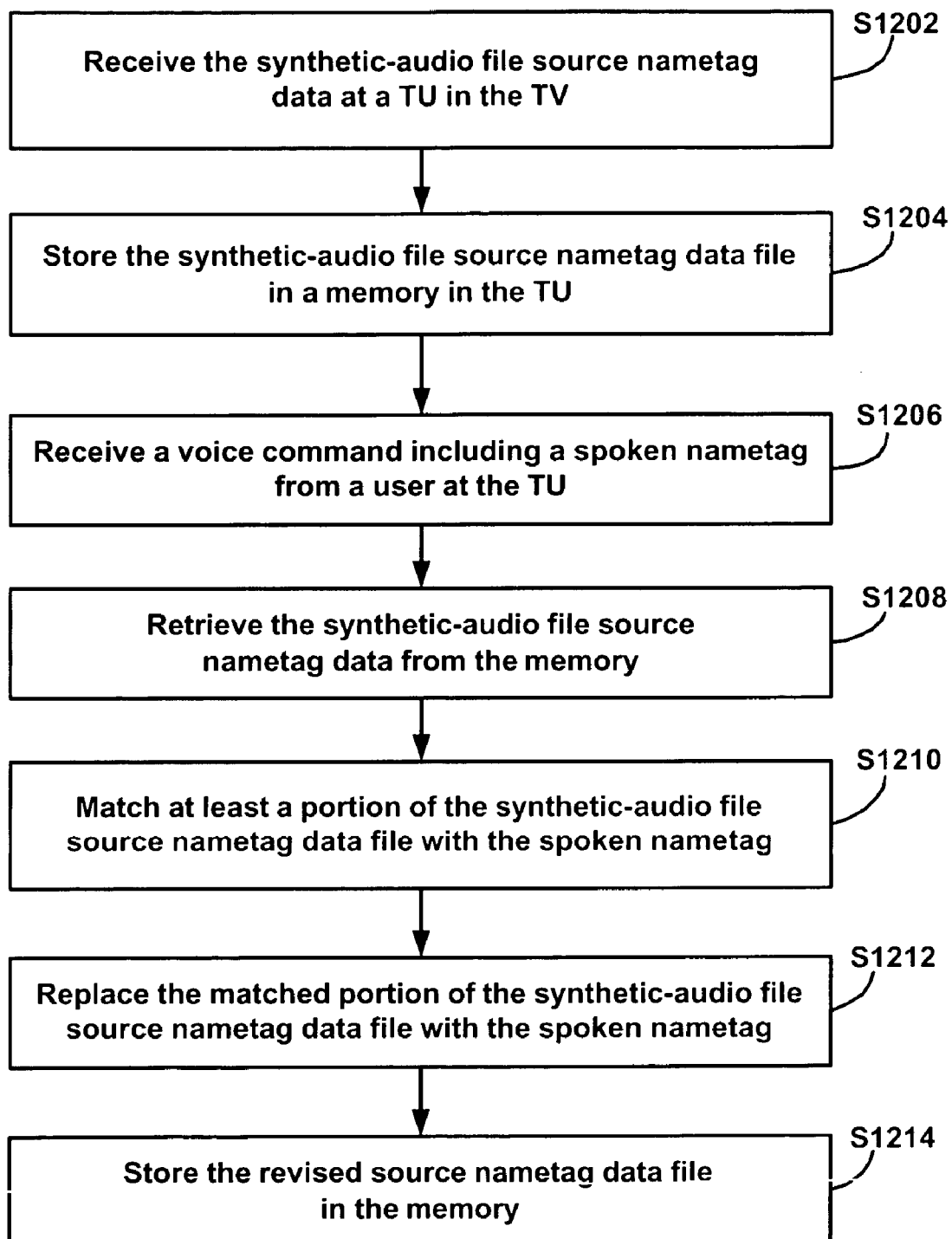
FIG. 12 illustrates a method of revising a source nametag data file at the telematics unit in accordance with the present invention.

FIG. 12 illustrates a method 1200 of revising a source nametag data file at the telematics unit 120 in accordance with the present invention. The telematics unit 120 has stored in computer readable medium at least one computer program including computer readable code to perform the operations described with reference to method 1200.

During stage S1202, the telematics unit 120 in the target vehicle 210 receives the modified source nametag data file wherein the modified source nametag data file is a synthetic-audio file source nametag data file generated as described above with reference to stage S1106 in method 1100 of FIG. 11. The synthetic-audio file source nametag data file was transmitted to the telematics unit 120 in the target vehicle 210 as described above with reference to stage S612 in method 600 of FIG. 6.

During stage S1204, the processor 122 in the telematics unit 120 stores the synthetic-audio file source nametag data file in the in-vehicle memory 138. During stage S1206, the telematics unit 120 receives a voice command spoken by the user into the microphone 130. The voice command includes a spoken nametag. During stage S1208, the telematics unit 120 retrieves the modified source nametag data file from the in-vehicle memory 138 in response to receiving the voice command. During stage S1210, the processor 122 in the telematics unit 120 matches at least a portion of the stored synthetic-audio file source nametag data file with the spoken nametag.

During stage S1212, the processor 122 in telematics 120 replaces the matched portion of the modified source nametag data file with the spoken nametag responsive to the matching. During stage S1214, the processor 122 in telematics 120 stores the revised source nametag data file in the in-vehicle memory 138. In this manner, the synthetic-audio file source nametag data file is replaced with the user-voice generated nametags, as the synthetic-audio file nametags in the nametag data file are spoken by the user in a voice command.

The method of transferring a nametag data file from a telematics unit 120 in a source vehicle 110 to a target handset 134, in which the target nametag data files are text files, was not described herein. However, those of ordinary skill in the art will understand that modifications can be made to the above described methods to convert the audio nametag data file in the telematics unit 120 to a text file and transfer the text file to the in-vehicle mobile phone 134 or personal handset 138 via the call center 170 as described above.

While the embodiments, of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A method of managing user nametags for a vehicle communications system, the method comprising:
   receiving a nametag transfer request at a call center from a source vehicle, comprising:
      receiving a selection of a source vehicle nametag data file to be transferred from the source vehicle to a target vehicle;
      receiving a source vehicle identification; and
      receiving a target vehicle identification;
   determining the target vehicle associated with the source vehicle based on the request, comprising:
      matching the target vehicle identification with a target vehicle data in a database in the call center; and
      retrieving an acoustic profile of the target vehicle and a target vehicle speech recognition identifier based on the matching; and
   modifying the source vehicle nametag data file based on the acoustic profile of the target vehicle, wherein modifying the source vehicle nametag data file based on the acoustic profile of the target vehicle comprises:
      matching the source vehicle identification with a source vehicle data in a database in the call center;
      retrieving an acoustic profile of the source vehicle, a source vehicle speech recognition identifier, and the source vehicle nametag data file from the source vehicle data;
      determining if the acoustic profile of the target vehicle matches the acoustic profile of the source vehicle;
      removing acoustic characteristics of the source vehicle from the retrieved selected source vehicle nametag data file based on the acoustic profile determination;
      adding acoustic characteristics of the target vehicle to the selected source vehicle nametag data file;
      determining if the target vehicle speech recognition identifier matches the source vehicle speech recognition identifier; and
      modifying the selected source vehicle nametag data file of the source vehicle based upon the determination.

2. A computer readable storage medium storing a computer program comprising: computer readable code for receiving a nametag transfer request at a call center from a source vehicle comprising: computer readable code for receiving a selection of a source vehicle nametag data file to be transferred from the source vehicle to a target vehicle;
   computer readable code for receiving a source vehicle identification; and
   computer readable code for receiving a target vehicle identification; computer readable code for determining the target vehicle associated with the source vehicle based on the request, comprising: computer readable code for matching the target vehicle identification with a target vehicle data in a database in the call center; and
   computer readable code for retrieving an acoustic profile of the target vehicle and a target speech recognition identifier based on the matching; and computer readable code for modifying the source vehicle nametag data file based on the acoustic profile of the target vehicle, wherein the computer readable code for modifying the source vehicle nametag data file based on the acoustic profile of the target vehicle comprises:
   computer readable code for matching the source vehicle identification with a source vehicle data in a database in the call center; computer readable code for retrieving an acoustic profile of the source vehicle, a source vehicle speech recognition identifier, and the source vehicle nametag data file from the source vehicle data;
   computer readable code for determining if the acoustic profile of the target vehicle matches the acoustic profile of the source vehicle; computer readable code for removing the acoustic characteristics of the source vehicle from the retrieved selected source vehicle nametag data file based on the acoustic profile determination;
   computer readable code for adding the acoustic characteristics of the target vehicle to the selected source vehicle nametag data file; computer readable code for determining if the target vehicle speech recognition identifier matches the source vehicle speech recognition identifier; and computer readable code for modifying the selected source vehicle nametag data file of the source vehicle based upon the determination.

3. The medium of claim 2, wherein the computer readable code for modifying the source vehicle nametag data file based on an acoustic profile of the target vehicle comprises:
   computer readable code for matching the source vehicle identification with the source vehicle data in a database in the call center;
   computer readable code for retrieving the source vehicle speech recognition identifier and the source vehicle nametag data file from the source vehicle data, wherein the source vehicle nametag data file is an audio file; and
   computer readable code for adding acoustic characteristics of the target vehicle to the selected source vehicle nametag data file.

4. The medium of claim 2, wherein the computer readable code for modifying the source vehicle nametag data file based on an acoustic profile of the target vehicle comprises:
   computer readable code for matching the source vehicle identification with the source vehicle data in a database in the call center;
   computer readable code for retrieving the source vehicle speech recognition identifier and the source vehicle nametag data file from the source vehicle data, wherein the source vehicle nametag data file is a text file;
   computer readable code for applying a text-to-speech algorithm to the received selected source vehicle nametag data file to generate an audio source nametag data file, wherein the generated audio source nametag data file is a synthetic-audio file; and
   computer readable code for adding acoustic characteristics of the target vehicle to the generated source vehicle nametag data file.

5. The medium of claim 2, further comprising:
   computer readable code for receiving the modified source vehicle nametag data file at a telematics unit in the target vehicle, wherein the modified source vehicle nametag data file is a synthetic-audio file;

computer readable code for storing the modified source vehicle nametag data file in a memory in the telematics unit;

computer readable code for receiving a voice command from a user at the telematics unit, wherein the voice command includes a spoken nametag;

computer readable code for retrieving the modified source vehicle nametag data file from the memory;

computer readable code for matching at least a portion of the stored modified source vehicle nametag data file with the spoken nametag;

computer readable code for replacing the matched portion of the modified source vehicle nametag data file with the spoken nametag responsive to the matching to form a revised source vehicle nametag data file; and computer readable code for storing the revised source vehicle nametag data file in the memory.

6. A method of managing user nametags for a vehicle communications system, the method comprising:

receiving a nametag transfer request at a call center from a source vehicle having a source nametag data file associated therewith;

determining a target vehicle associated with the source vehicle based on the request;

determining if an acoustic profile of the target vehicle matches an acoustic profile of the source vehicle; and removing acoustic characteristics of the source vehicle from the source nametag data file based on the acoustic profile determination.

7. The method of claim 6, further comprising:

adding acoustic characteristics of the target vehicle to the source nametag data file based on the acoustic profile determination.

8. The method of claim 7, wherein the acoustic profile includes data as to at least one of year, make, or model of at least one of the target or source vehicles.

9. The method of claim 7, wherein the acoustic characteristics includes vehicle noise at idle of at least one of the target or source vehicles.

10. The method of claim 7, further comprising:

determining whether a target vehicle speech recognition identifier matches a source vehicle speech recognition identifier; and modifying the source nametag data file if the target vehicle speech recognition identifier does not match the source vehicle speech recognition identifier.

\* \* \* \* \*